(12) United States Patent
Rather et al.

(10) Patent No.: US 12,705,144 B2
(45) **Date of Patent: *Aug. 11, 2026**

(54) DYNAMIC IMPLEMENTATION OF A BACKUP POLICY FOR DATABASE RECOVERY

(71) Applicant: Nutanix, Inc., San Jose, CA (US)

(72) Inventors: Adil Gul Rather, Bangalore (IN); Akshay Ashok Chandak, Bangalore (IN); Altaf Mahmood, Bangalore (IN); Jagadeesh Kumar Dittakavi, Bengaluru (IN)

(73) Assignee: Nutanix, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/221,470

(22) Filed: May 28, 2025

(65) Prior Publication Data

US 2025/0390398 A1 Dec. 25, 2025

Related U.S. Application Data

(63) Continuation of application No. 18/795,110, filed on Aug. 5, 2024, now Pat. No. 12,321,244.

(30) Foreign Application Priority Data

Jun. 19, 2024 (IN) ............................ 202441047174

(51) Int. Cl.
*G06F 11/1446* (2026.01)

(52) U.S. Cl.
CPC ...... *G06F 11/1469* (2013.01); *G06F 2201/80* (2013.01)

(58) Field of Classification Search
None
See application file for complete search history.

(56) References Cited

U.S. PATENT DOCUMENTS 8,549,518 B1 10/2013 Aron et al.
8,601,473 B1 12/2013 Aron et al.
8,850,130 B1 9/2014 Aron et al.
8,863,124 B1 10/2014 Aron
9,009,106 B1 4/2015 Aron et al.
(Continued)

OTHER PUBLICATIONS

Cano, Ignacio, et al. “Curator: Self-Managing Storage for Enterprise Clusters” (Mar. 27, 2017), from https://www.usenix.org/conference/nsdi17/.
(Continued)

*Primary Examiner* — Eddy Cheung
(74) *Attorney, Agent, or Firm* — Foley & Lardner LLP

(57) ABSTRACT

A method may include, based on a recovery policy associated with the primary database, creating a first snapshot of the primary database at a primary computing system, replicating the first snapshot of the primary database to a secondary computing system, wherein a backup database of the primary database is hosted on the secondary cluster, in response to the primary database being unavailable, applying the first snapshot of the primary database to the backup database, creating, according to the recovery policy associated with the primary database, a snapshot of the backup database, in response to the primary database having restored availability, creating, according to the recovery policy associated with the primary database, a second snapshot of the primary database.

20 Claims, 6 Drawing Sheets

(56) References Cited

U.S. PATENT DOCUMENTS

| | | | |
|---|---|---|---|
| 9,069,708 | B2 | 6/2015 | Gill et al. |
| 9,336,132 | B1 | 5/2016 | Aron et al. |
| 9,652,265 | B1 | 5/2017 | Narayanasamy et al. |
| 9,772,866 | B1 | 9/2017 | Aron et al. |
| 2016/0203054 | A1 | 7/2016 | Zhang et al. |
| 2019/0391883 | A1 | 12/2019 | Wang et al. |
| 2021/0406132 | A1 | 12/2021 | Gupta et al. |
| 2022/0004469 | A1 | 1/2022 | Shen et al. |
| 2022/0050753 | A1 | 2/2022 | Mehta et al. |

OTHER PUBLICATIONS

Poitras, Steven. "The Nutanix Bible" (Jan. 11, 2014), from http://stevenpoitras.com/the-nutanix-bible/ (Publication date based on indicated capture date by Archive.org; first publication date unknown).
Poitras, Steven. "The Nutanix Bible" (Oct. 15, 2013), from http://stevenpoitras.com/the-nutanix-bible/ (Publication date based on indicated capture date by Archive.org; first publication date unknown).
Poitras, Steven. "The Nutanix Bible" (Sep. 17, 2019), from https://nutanixbible.com/.
Poitras, Steven. "The Nutanix Bible" (Jun. 20, 2014), from http://stevenpoitras.com/the-nutanix-bible/ (Publication date based on indicated capture date by Archive.org; first publication date unknown).
Poitras, Steven. "The Nutanix Bible" (Jan. 7, 2015), from http://stevenpoitras.com/the-nutanix-bible/ (Publication date based on indicated capture date by Archive.org; first publication date unknown).
Poitras, Steven. "The Nutanix Bible" (Jun. 9, 2015), from http://stevenpoitras.com/the-nutanix-bible/ (Publication date based on indicated capture date by Archive.org; first publication date unknown).
Sontakke, et al, "Tessell Availability Machine: Why, What, How?", Aug. 17, 2023, https://www.tessell.com/blogs/why-what-how-of-tessell-availability-machine.
"Backing up Oracle databases configured using Data Guard", https://vox.veritas.com/t5/NetBackup/Backing-up-Oracle-databases-configured-using-Data-Guard/td-p/653210.
"Snapshot replication", Sep. 27, 2024, https://learn.microsoft.com/en-us/sql/relational-databases/replication/snapshot-replication?view=sql-server-ver16.
Druva, "Manage backup policy", 2025, https://docs.druva.com/Phoenix/030_Configure_Phoenix_for_Backup/060_Backup_and_Restore_Oracle_Databases/Backup_and_Restore_Oracle_Databases_Direct_to_Cloud/040_Manage_Oracle_Servers_and_Databases/040_Manage_backup_policy.
IBM Corp, "Data Recovery and High Availability Guide and Reference", 2012, https://publibfp.dhe.ibm.com/epubs/pdf/c2738700.pdf.
Kim, Charles, "Oracle Maximum Availability Architecture Case Study", 2000-2006, pp. 1-107.
Oracle, "Physical Standby Database creation using Snapshot Replication", Jun. 9, 2025, https://support.purestorage.com/bundle/m_oracle/page/Solutions/Oracle/Backup_and_Recovery/topics/concept/c_purpose_26.html.
Rubrik, "Restore and recovery of SQL Server databases", https://docs.rubrik.com/en-us/saas/saas/mssql_restore_recovery_SQLServer_databases.html.
Snowflake, "Introduction to replication and failover across multiple accounts", https://docs.snowflake.com/en/user-guide/account-replication-intro.
Vellante, "Oracle Backup and Recovery Strategies: Moving to Data-Protection-as-a-Service", Oct. 22, 2015, https://thecuberesearch.com/oracle-backup-and-recovery-strategies-moving-to-data-protection-as-a-service/.

DYNAMIC IMPLEMENTATION OF A BACKUP POLICY FOR DATABASE RECOVERY

CROSS-REFERENCE TO RELATED APPLICATIONS

This application is a Continuation of U.S. patent application Ser. No. 18/795,110, filed on Aug. 5, 2024 which claims priority to Indian Provisional Patent Application No.: 202441047174, filed Jun. 19, 2024, which application is incorporated herein by reference in its entirety for all purposes.

BACKGROUND

Databases may be backed up to prevent data loss in the event of database failure. Asynchronous replication of a database to a backup database does not cause write latency at the database, but can cause data loss due to a lag between the database and the backup database.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing.

DETAILED DESCRIPTION

Figure 1:
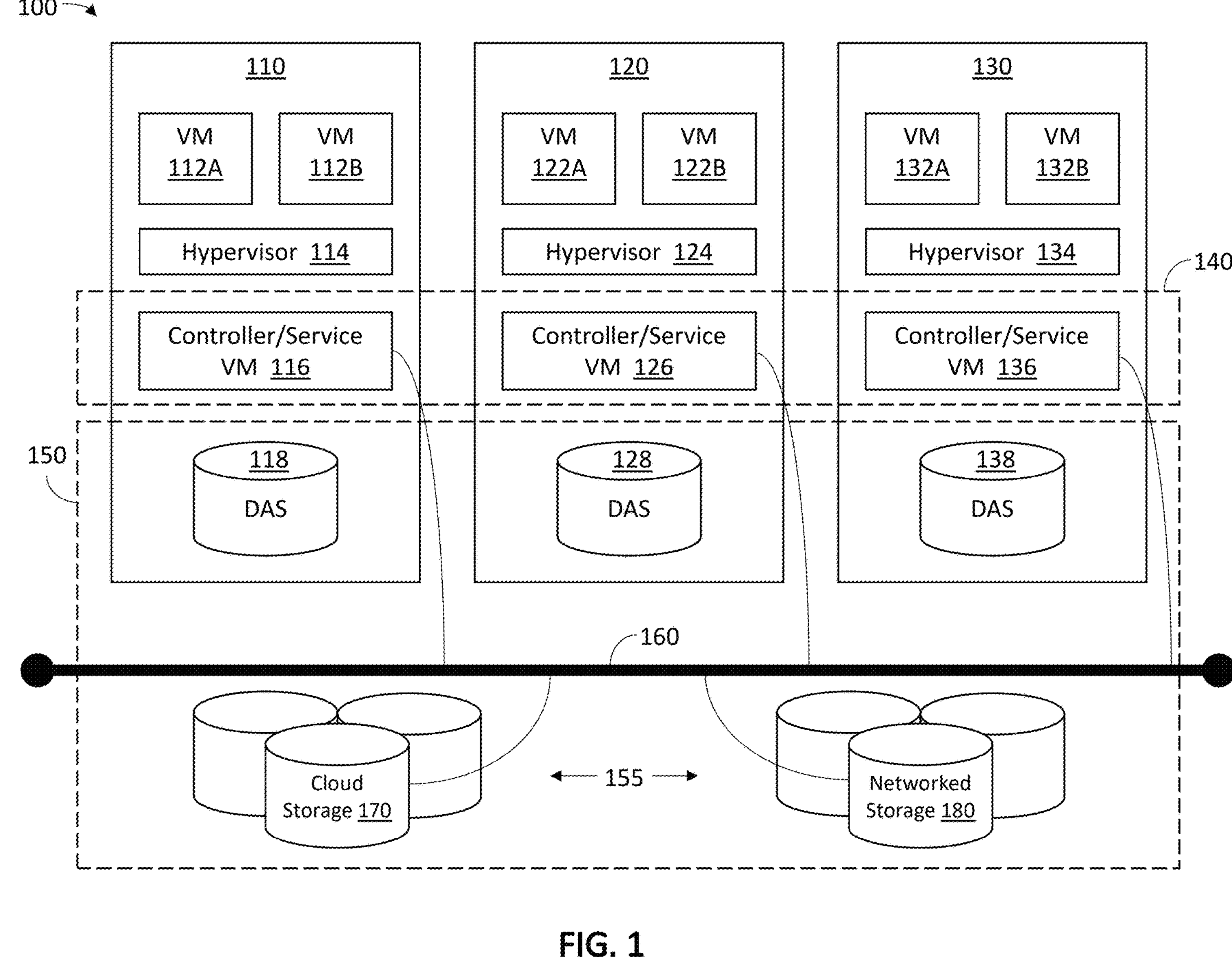
FIG. 1 is a block diagram of an example cluster of a virtual computing system, in accordance with some embodiments of the present disclosure.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

A database can be synchronized with a backup database for disaster recovery, data protection, and reporting. Asynchronous replication of the database to the backup database is preferable, as asynchronous replication replicates changes to the database after they are written, avoiding write latency at the database. However, this introduces synchronization lag between the database and the backup database. This synchronization lag can span from minutes to hours, providing a window for data loss in the event of failure of the database. Embodiments discussed herein solve this problem by providing for a single backup policy for the database which captures snapshots and logs of the database and replicates the snapshots and logs to a host of the backup database. The frequency of the capture of the snapshots and logs reduces the window for data loss relative to the asynchronous replication. In the event of failure of the database, the single backup policy switches to the backup database to capture snapshots and logs for the backup database. The snapshots and logs of the database are applied to the backup database to make the backup database current, and the backup database functions as the active database for any applications that used the database as the active database. In this way, the single backup policy efficiently ensures that the data of the database is preserved and the applications can continue to function with minimal data loss, whether the database is functioning or failed. When the database is once again available, the single backup policy switches back to the database, the snapshots and logs of the backup database are applied to the database to make the database current, and the single backup policy resumes capturing snapshots and logs of the database. The captured snapshots and logs are replicated to the host of the backup database to continue to provide security for the data of the database. In this way, a single backup policy efficiently provides backup protection for the data of the database, reducing a recovery point objective (RPO) for the database and allowing for quick, graceful failover to the backup database and failback to the database.

FIG. 1 is a block diagram of an example cluster 100 of a virtual computing system, in accordance with some embodiments of the present disclosure. The cluster 100 may be incorporated in a cloud based implementation, an on-premises implementation, or a combination of both. An on-premises implementation may be a datacenter that is not part of a cloud. In an example, an organization's servers that it owns and controls for its use can be an on-premises implementation. The cluster 100 may be part of a hyperconverged system or any other type of system. The cluster 100 includes a plurality of nodes, such as a first node 110, a second node 120, and a third node 130. Each of the first node 110, the second node 120, and the third node 130 may also be referred to as a "host" or "host machine." The first node 110 includes database virtual machines ("database VMs") 112A and 112B (collectively referred to herein as "database VMs 112"), a hypervisor 114 configured to create and run the database VMs, and a controller/service VM 116 configured to manage, route, and otherwise handle workflow requests between the various nodes of the cluster 100. Similarly, the second node 120 includes database VMs 122A and 122B (collectively referred to herein as "database VMs 122"), a hypervisor 124, and a controller/service VM 126, and the third node 130 includes database VMs 132A and 132B (collectively referred to herein as "database VMs 132"), a hypervisor 134, and a controller/service VM 136. The controller/service VM 116, the controller/service VM 126, and the controller/service VM 136 are all connected to a network 160 to facilitate communication between the first node 110, the second node 120, and the third node 130. Although not shown, in some embodiments, the hypervisor 114, the hypervisor 124, and the hypervisor 134 may also be connected to the network 160. Further, although not shown, one or more of the first node 110, the second node 120, and the third node 130 may include one or more containers managed by a monitor (e.g., container system). In some embodiments, the controller/service VMs 116, 126, and 136 are not included in the cluster 100. The controller/service VMs 116, 126, and 136 may be in a first domain while the VMs 112, 122, and 132 are in a second domain. In an example, the controller/service VMs 116, 126, 136 are in a first cloud, the VMs 112 are in a second cloud, the VMs 116 are in a third cloud, and the VMs 132 are in a fourth cloud. In another example, the controller/service VMs 116, 124, 132 are in a first AWS account and the VMs 112, 122, and 132 are each in different, separate AWS accounts. Thus, the nodes 110, 120, and 130 may be nodes of various public or private clouds, with the controller/service VMs 116, 126, and 136 being separate from the VMs 112, 122, and 132. In an example, the controller/service VMs 116, 126, and 136 host a distributed control plane for managing the VMs 112, 122, and 132, where the VMs 112, 122, and 132 are database server VMs in public cloud accounts separate from a cloud account associated with the control plane.

The controller/service VMs 116, 126, and 136 can be considered a control plane and the VMs 112, 122, and 132 can be considered a data plane. The data plane may include data which is separate from the control logic executed on the control plane. VMs may be added to or removed from the data plane. AS discussed above, the control plane and the data plane may be in separate cloud accounts. Different VMs in the data plane may be in separate cloud accounts. In an example, the control plane is in a cloud account of a database management platform provider and the data plane is in cloud accounts of customers of the database management platform provider.

The cluster 100 also includes and/or is associated with a storage pool 150 (also referred to herein as storage subsystem). The storage pool 150 may include network-attached storage 155 and direct-attached storage 118, 128, and 138. The network-attached storage 155 is accessible via the network 160 and, in some embodiments, may include cloud storage 170, as well as a networked storage 180. In contrast to the network-attached storage 155, which is accessible via the network 160, the direct-attached storage 118, 128, and 138 includes storage components that are provided internally within each of the first node 110, the second node 120, and the third node 130, respectively, such that each of the first, second, and third nodes may access its respective direct-attached storage without having to access the network 160.

It is to be understood that only certain components of the cluster 100 are shown in FIG. 1. Nevertheless, several other components that are needed or desired in the cluster 100 to perform the functions described herein are contemplated and considered within the scope of the present disclosure.

Although three of the plurality of nodes (e.g., the first node 110, the second node 120, and the third node 130) are shown in the cluster 100, in other embodiments, greater than or fewer than three nodes may be provided within the cluster. Likewise, although only two database VMs (e.g., the database VMs 112, the database VMs 122, the database VMs 132) are shown on each of the first node 110, the second node 120, and the third node 130, in other embodiments, the number of the database VMs on each of the first, second, and third nodes may vary to include other numbers of database VMs. Further, the first node 110, the second node 120, and the third node 130 may have the same number of database VMs (e.g., the database VMs 112, the database VMs 122, the database VMs 132) or different number of database VMs.

In some embodiments, each of the first node 110, the second node 120, and the third node 130 may include a hardware device, such as a server. For example, in some embodiments, one or more of the first node 110, the second node 120, and the third node 130 may include a server computer provided by Nutanix, Inc., Dell, Inc., Lenovo Group Ltd. or Lenovo PC International, Cisco Systems, Inc., etc. In other embodiments, one or more of the first node 110, the second node 120, or the third node 130 may include another type of hardware device, such as a personal computer, an input/output or peripheral unit such as a printer, or any type of device that is suitable for use in a node within the cluster 100. In some embodiments, the cluster 100 may be part of one or more data centers. Further, one or more of the first node 110, the second node 120, and the third node 130 may be organized in a variety of network topologies. Each of the first node 110, the second node 120, and the third node 130 may also be configured to communicate and share resources with each other via the network 160. For example, in some embodiments, the first node 110, the second node 120, and the third node 130 may communicate and share resources with each other via the controller/service VM 116, the controller/service VM 126, and the controller/service VM 136, and/or the hypervisor 114, the hypervisor 124, and the hypervisor 134.

Also, although not shown, one or more of the first node 110, the second node 120, and the third node 130 may include one or more processing units configured to execute instructions. The instructions may be carried out by a special purpose computer, logic circuits, or hardware circuits of the first node 110, the second node 120, and the third node 130. The processing units may be implemented in hardware, firmware, software, or any combination thereof. The term "execution" is, for example, the process of running an application or the carrying out of the operation called for by an instruction. The instructions may be written using one or more programming languages, scripting languages, assembly language, etc. The processing units, thus, execute an instruction, meaning that they perform the operations called for by that instruction. The processing units may be operably coupled to the storage pool 150, as well as with other elements of the first node 110, the second node 120, and the third node 130 to receive, send, and process information, and to control the operations of the underlying first, second, or third node. The processing units may retrieve a set of instructions from the storage pool 150, such as, from a permanent memory device like a read only memory ("ROM") device and copy the instructions in an executable form to a temporary memory device that is generally some form of random access memory ("RAM"). The ROM and RAM may both be part of the storage pool 150, or in some embodiments, may be separately provisioned from the storage pool. In some embodiments, the processing units may execute instructions without first copying the instructions to the RAM. Further, the processing units may include a single stand-alone processing unit, or a plurality of processing units that use the same or different processing technology.

With respect to the storage pool 150 and particularly with respect to the direct-attached storage 118, 128, and 138, each of the direct-attached storage may include a variety of types of memory devices that are suitable for a virtual computing system. For example, in some embodiments, one or more of the direct-attached storage 118, 128, and 138 may include, but is not limited to, any type of RAM, ROM, flash memory, magnetic storage devices (e.g., hard disk, floppy disk, magnetic strips, etc.), optical disks (e.g., compact disk ("CD"), digital versatile disk ("DVD"), etc.), smart cards, solid state devices, etc. Likewise, the network-attached storage 155 may include any of a variety of network accessible storage (e.g., the cloud storage 170, the networked storage 180, etc.) that is suitable for use within the cluster 100 and accessible via the network 160. The storage pool 150, including the network-attached storage 155 and the direct-attached storage 118, 128, and 138, together form a distributed storage system configured to be accessed by each of the first node 110, the second node 120, and the third node 130 via the network 160, the controller/service VM 116, the controller/service VM 126, the controller/service VM 136, and/or the hypervisor 114, the hypervisor 124, and the hypervisor 134. In some embodiments, the various storage components in the storage pool 150 may be configured as virtual disks for access by the database VMs 112, the database VMs 122, and the database VMs 132.

Each of the database VMs 112, the database VMs 122, the database VMs 132 is a software-based implementation of a computing machine. The database VMs 112, the database VMs 122, the database VMs 132 emulate the functionality of a physical computer. Specifically, the hardware resources, such as processing unit, memory, storage, etc., of the underlying computer (e.g., the first node 110, the second node 120, and the third node 130) are virtualized or transformed by the respective hypervisor 114, the hypervisor 124, and the hypervisor 134, into the underlying support for each of the database VMs 112, the database VMs 122, the database VMs 132 that may run its own operating system and applications on the underlying physical resources just like a real computer. By encapsulating an entire machine, including CPU, memory, operating system, storage devices, and network devices, the database VMs 112, the database VMs 122, the database VMs 132 are compatible with most standard operating systems (e.g. Windows, Linux, etc.), applications, and device drivers.

Thus, each of the hypervisor 114, the hypervisor 124, and the hypervisor 134 is a virtual machine monitor that allows a single physical server computer (e.g., the first node 110, the second node 120, third node 130) to run multiple instances of the database VMs 112, the database VMs 122, and the database VMs 132 with each VM sharing the resources of that one physical server computer, potentially across multiple environments. For example, each of the hypervisor 114, the hypervisor 124, and the hypervisor 134 may allocate memory and other resources to the underlying VMs (e.g., the database VMs 112, the database VMs 122, the database VM 132A, and the database VM 132B) from the storage pool 150 to perform one or more functions.

By running the database VMs 112, the database VMs 122, and the database VMs 132 on each of the first node 110, the second node 120, and the third node 130, respectively, multiple workloads and multiple operating systems may be run on a single piece of underlying hardware computer (e.g., the first node, the second node, and the third node) to increase resource utilization and manage workflow. When new database VMs are created (e.g., installed) on the first node 110, the second node 120, and the third node 130, each of the new database VMs may be configured to be associated with certain hardware resources, software resources, storage resources, and other resources within the cluster 100 to allow those virtual VMs to operate as intended.

The database VMs 112, the database VMs 122, the database VMs 132, and any newly created instances of the database VMs may be controlled and managed by their respective instance of the controller/service VM 116, the controller/service VM 126, and the controller/service VM 136. The controller/service VM 116, the controller/service VM 126, and the controller/service VM 136 are configured to communicate with each other via the network 160 to form a distributed system 140. Each of the controller/service VM 116, the controller/service VM 126, and the controller/service VM 136 may be considered a local management system configured to manage various tasks and operations within the cluster 100. For example, in some embodiments, the local management system may perform various management related tasks on the database VMs 112, the database VMs 122, and the database VMs 132.

The hypervisor 114, the hypervisor 124, and the hypervisor 134 of the first node 110, the second node 120, and the third node 130, respectively, may be configured to run virtualization software, such as, ESXi from VMWare, AHV from Nutanix, Inc., XenServer from Citrix Systems, Inc., etc. The virtualization software on the hypervisor 114, the hypervisor 124, and the hypervisor 134 may be configured for running the database VMs 112, the database VMs 122, the database VM 132A, and the database VM 132B, respectively, and for managing the interactions between those VMs and the underlying hardware of the first node 110, the second node 120, and the third node 130. Each of the controller/service VM 116, the controller/service VM 126, the controller/service VM 136, the hypervisor 114, the hypervisor 124, and the hypervisor 134 may be configured as suitable for use within the cluster 100.

The network 160 may include any of a variety of wired or wireless network channels that may be suitable for use within the cluster 100. For example, in some embodiments, the network 160 may include wired connections, such as an Ethernet connection, one or more twisted pair wires, coaxial cables, fiber optic cables, etc. In other embodiments, the network 160 may include wireless connections, such as microwaves, infrared waves, radio waves, spread spectrum technologies, satellites, etc. The network 160 may also be configured to communicate with another device using cellular networks, local area networks, wide area networks, the Internet, etc. In some embodiments, the network 160 may include a combination of wired and wireless communications. The network 160 may also include or be associated with network interfaces, switches, routers, network cards, and/or other hardware, software, and/or firmware components that may be needed or considered desirable to have in facilitating intercommunication within the cluster 100.

Referring still to FIG. 1, in some embodiments, one of the first node 110, the second node 120, or the third node 130 may be configured as a leader node. The leader node may be configured to monitor and handle requests from other nodes in the cluster 100. For example, a particular database VM (e.g., the database VMs 112, the database VMs 122, or the database VMs 132) may direct an input/output request to the controller/service VM (e.g., the controller/service VM 116, the controller/service VM 126, or the controller/service VM 136, respectively) on the underlying node (e.g., the first node 110, the second node 120, or the third node 130, respectively). Upon receiving the input/output request, that controller/service VM may direct the input/output request to the controller/service VM (e.g., one of the controller/service VM 116, the controller/service VM 126, or the controller/service VM 136) of the leader node. In some cases, the controller/service VM that receives the input/output request may itself be on the leader node, in which case, the controller/service VM does not transfer the request, but rather handles the request itself.

The controller/service VM of the leader node may fulfill the input/output request (and/or request another component within/outside the cluster 100 to fulfill that request). Upon fulfilling the input/output request, the controller/service VM of the leader node may send a response back to the controller/service VM of the node from which the request was received, which in turn may pass the response to the database VM that initiated the request. In a similar manner, the leader node may also be configured to receive and handle requests (e.g., user requests) from outside of the cluster 100. If the leader node fails, another leader node may be designated.

Additionally, in some embodiments, although not shown, the cluster 100 may be associated with a central management system that is configured to manage and control the operation of multiple clusters in the virtual computing system. In some embodiments, the central management system may be configured to communicate with the local management systems on each of the controller/service VM 116, the controller/service VM 126, the controller/service VM 136 for controlling the various clusters.

Again, it is to be understood again that only certain components and features of the cluster 100 are shown and described herein. Nevertheless, other components and features that may be needed or desired to perform the functions described herein are contemplated and considered within the scope of the present disclosure. It is also to be understood that the configuration of the various components of the cluster 100 described above is only an example and is not intended to be limiting in any way. Rather, the configuration of those components may vary to perform the functions described herein. For example, in some embodiments, the VMs 112, 122, and 132 are not in the same nodes as the controller/service VMs 116, 126 134. The VMs 112, 122, and 132 may be located in a different cloud than the controller/service VMs 116, 126 134.

Figure 2:
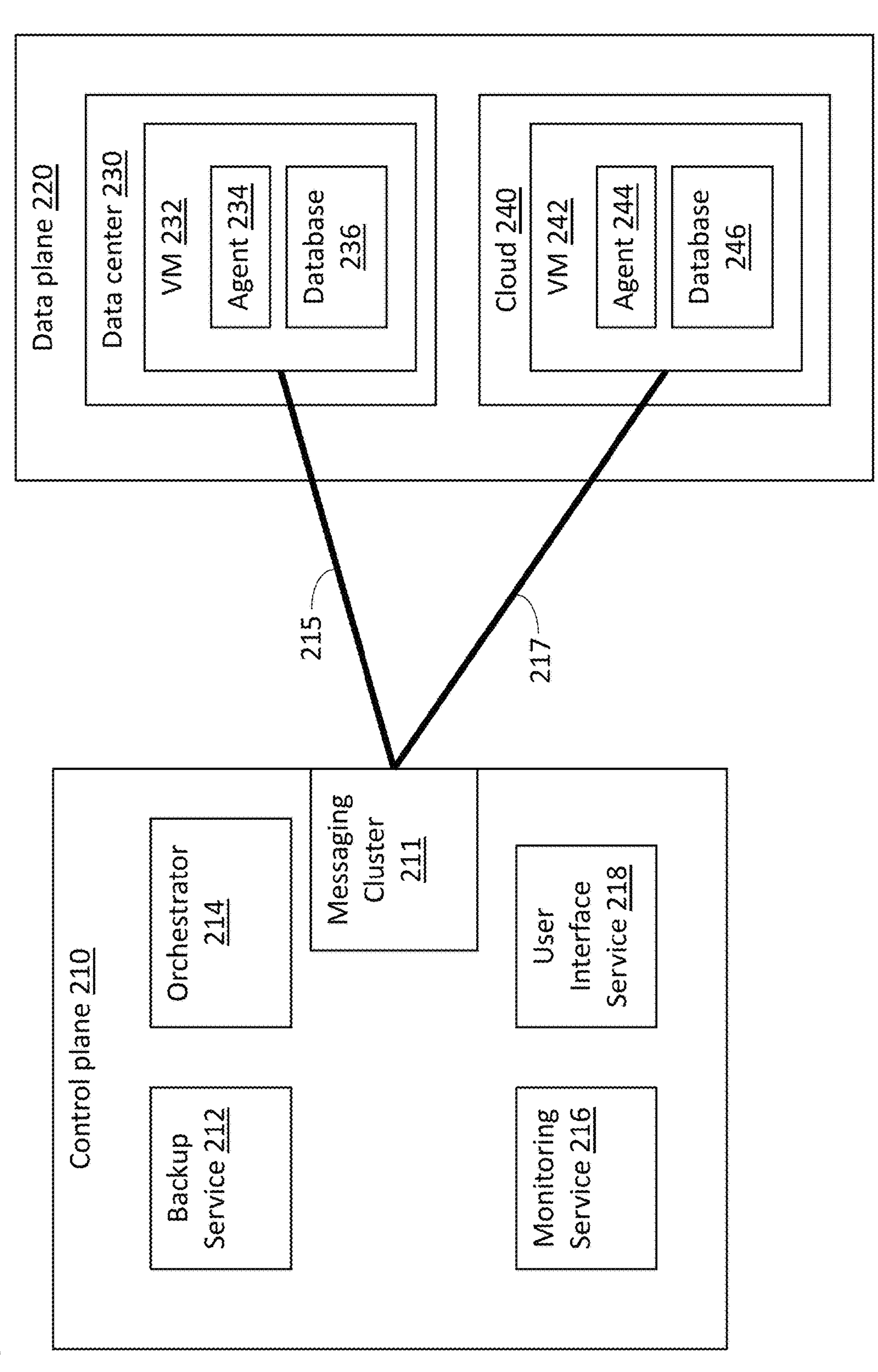
FIG. 2 is a block diagram of an example database management system, in accordance with some embodiments of the present disclosure.

FIG. 2 is a block diagram of an example database management system 200, in accordance with some embodiments of the present disclosure. The database management system 200 may be implemented using one or more clusters, such as the cluster 100 of FIG. 1. In some implementations, one or more components of the database management system 200 are implemented as clusters.

The database management system 200 includes a control plane 210 and a data plane 220. The control plane 210 manages database operations of databases on the data plane 220. The data plane 220 may include databases and virtual machines across multiple different geographies, data centers, public clouds and/or private clouds. Thus, the control plane 210 may manage database operations across multiple different geographies, data centers, public clouds and/or private clouds. The control plane 210 may provide hybrid cloud database management services for databases having instances both on-premises and in public clouds. The control plane 210 may include one or more processors and a memory including computer-readable instructions which cause the one or more processors to perform operations described herein.

The data plane 220 includes a first VM 232 and a second VM 242. The first VM 232 may be hosted in a data center 230. The second VM may be hosted on a cloud 240 such as a public or private cloud and be associated with a cloud account. The first VM 232 includes a first agent 234 of the control plane 210 and a first database 236. The first agent 234 receives commands and operations from the control plane 210 and transmits information to the control plane 210 to provide database management services for the first database 236. The second VM includes a second agent 244 of the control plane 210 and a second database 246. The second agent 244 receives commands and operations from the control plane 210 and transmits information to the control plane 210 to provide database management services for the second database 246.

While the data plane 220 is illustrated as including the first VM 232 hosted in the data center 230 and the second VM 242 hosted on the cloud 240, the data plane 220 may manage database operations of (e.g., send commands to) a plurality of VMs hosted across multiple public clouds, private clouds, and/or on-premises systems. Similarly, the data center 230 may host a plurality of VMs and may include one or more on-premises systems and/or components of a public cloud or private cloud. The control plane 210 may be able to manage database operations of the plurality of VMs across the multiple public clouds, private clouds, and/or on-premises systems by sending commands, modified based on the hosting location, to the plurality of VMs. In this way, the control plane 210 provides a unified user interface for managing VMs in a hybrid cloud environment spanning on-premises systems, public clouds, and private clouds.

The first and second VMs 232, 242 may be termed "database servers," as they serve as virtual database servers for hosting the first and second databases 236, 246. The first and second VMs 232, 242 may be hosted on clusters of nodes, such as the cluster 100 of FIG. 1.

The first agent 234 sends and receives messages from the control plane 210 over a first single communication channel 215. The second agent 244 sends and receives messages from the control plane 210 over a second single communication channel 217. Each of the first and second single communication channels 215, 217 may be single transmission control protocol (TCP) connections. In this way, the control plane 210 is able to open only a single communication channel for each agent associated with each database. Although two VMs are illustrated, the control plane 210 may provide database management services for hundreds, thousands, or millions of VMs. With hundreds of VMs, limiting the number of connections between the control plane 210 and each VM conserves a large amount of compute and network resources.

The control plane 210 includes a messaging cluster 211. The messaging cluster 211 may be a cluster of nodes such as the cluster 100 of FIG. 1 executing a messaging service or messaging application. The messaging cluster 211 may receive messages from the first agent 234 over the first single communication channel 215 and messages from the second agent 244 over the second single communication channel 217. The messaging cluster 211 may isolate messages between different VMs. In an example, the messaging cluster 211 monitors tags, ids, or other indications of origin of the messages to determine that messages from the first agent 234 are received on the first single communication channel 215. In this example, if a message received on the first single communication channel 215 includes an identifier indicating the message originated at a different VM, the message is dropped. Similarly, if a message including an identifier of the first VM 232 is received on the second communication channel 217 or any other communication channel besides the first communication channel 215, the message is dropped.

The messaging cluster 211 may direct messages from the first and second VMs 232, 242 to various components of the control plane 210 based on characteristics of the control plane 210. The messaging cluster 211 may include different topics for sending and receiving messages on the first and second single communication channels 215, 217. In an example, the messaging cluster 211 may route messages in an operations topic, a requests topic, and a commands topic.

The control plane 210 includes an orchestrator 214 to orchestrate database management services. In some implementations, the orchestrator 214 may be implemented as a service or container. Similarly, other components of the control plane 210 may be implemented as services or containers. The orchestrator 214 may receive database management service requests from other components of the control plane 210. The orchestrator 214 generates operations and sends the operations and/or commands associated with the operations to the messaging cluster 211. In an example, the orchestrator receives a clone database request for the first VM 232, generates a clone database operation, and sends commands for generating a clone database for the first VM 232 to the messaging cluster 211 for sending to the first agent 234 using the first single communication channel 215.

The control plane includes a backup service 212. The backup service 212 may determine when to generate backups of the first and second VMs 232, 242 and/or when to generate clone databases for the first and second databases 236, 246. The backup service 212 may determine when to generate backups and/or clone databases based on service level agreements (SLAs). In an example, a first SLA for the first VM 232 may cause the backup service 212 to generate and send a backup request for the first VM 232 to the orchestrator 214 every day. In an example, a second SLA for the second VM 242 may cause the backup service 212 to generate and send a backup request for the second VM 242 to the orchestrator 214 every day.

The control plane includes a monitoring service 216. The monitoring service 216 may monitor a status of the first database 236 and/or a status of the second database 246. In some implementations, the second database 246 is a backup database of the first database 236 and the monitoring service 216 monitors the status of the first database 236 in order to determine when to recover the first database 236 using the second database 246 or to perform a failover to the second database 246. The monitoring service 216 may monitor the status of the first database 236 and/or the status of the second database 246 by monitoring messages between the control plane 210 and the first and second databases 236, 246. In an example, if the control plane 210 sends a message to the first database 236 and a response is not received within a predetermined time period, the monitoring service 216 determines that the first database 236 is not available.

The control plane 210 includes a user interface service 218. The user interface service 218 provides an interface for a user of the control plane 210. The user interface service 218 may expose data of the control plane 210 to the user. The user interface service 218 may expose only data associated with the user to the user. The user interface service 218 displays which backups and/or clones are available for recovery. The user interface service 218 may display which backups and/or clones are pending. The user interface service 218 receives user input, such as a selection of a backup for recovery or a selection of an SLA for a VM.

The control plane 210 may include additional components not illustrated. Only the illustrated components are included for clarity. In some implementations, multiple instances of the control plane 210 may be implemented in order to provide database management services to additional virtual machines or databases. In some implementations, the components of the control plane 210 may be services which may be implemented in multiple instances. In this way, the control plane 210 is highly scalable to provide database management services to additional VMs.

In some implementations, the backup service 212 includes backup service entities, or instances on the control plane 210 that are created each time a database is provisioned. Each backup service entity is associated with a database and manages all database management tasks for the associated database. The backup service entity may be a logic construct that handles all data management aspects for the associated database. The backup service entity can handle the creation of backups for the database, the creation of snapshots, and the capture of logs. In some implementations, the backup service entity defines a service level agreement (SLA) or ingest an SLA to be applied to the database. The backup service entity can provide point-in-time recovery (PITR) for the database using the captured snapshots and logs. In an example, a user indicates, using the user interface service 218 that the database is to be restored to a particular point in time, and the backup service entity applies a corresponding snapshot and logs to the database to restore the database to the particular point in time. The backup service entity allows for management of data of the database, providing for users to export some or all of the data of the database (e.g., schema, tables, rows). The database entity can provide metadata management, allowing applications to use the database as a dedicated metadata store. The backup service entity can detect sensitive data in the database. In some implementations, the backup service entity can obscure or mask the sensitive data. The backup service entity may allow for users to specify who can access the database (e.g., access policy). The backup service entity can allow users to set data pipelines, such as data lakes. In an example, the backup service entity performs data processing on data in the database, or orchestrates data processing of the data in the database to send the data to a data store (e.g., data lake, data warehouse). In some implementations, the backup service entity provides data analytics corresponding to usage of the data in the database, an amount of data in the database, changes to the data in the database, and other information.

Figure 3:
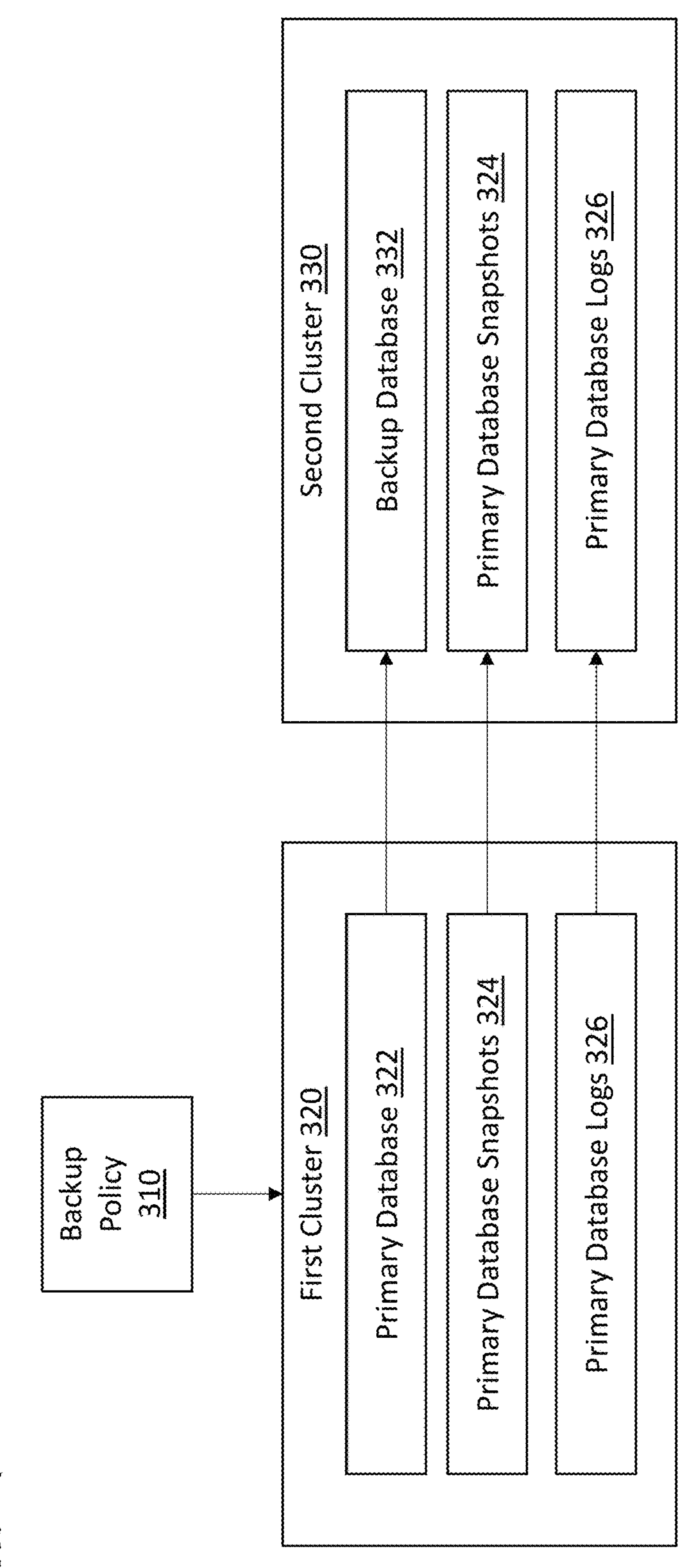
FIG. 3 is a block diagram of an example system for failover from a primary database to a backup database.

FIG. 3 is a block diagram of an example system 300 for failover from a primary database 322 to a backup database 332. The system 300 includes a first cluster 320 (also referred to as a first computing system) hosting the primary database 322. The first cluster 320 may be a cluster similar to the cluster 100 of FIG. 1. The primary database 322 may be associated with a backup policy 310. The backup policy 310 may be a policy defining a frequency of backup. The backup policy 310 may be implemented by a control plane of a database management system, such as the control plane 210 and/or the backup service 212 of FIG. 2. In some implementations, the backup policy 310 defines a frequency of capture for primary database snapshots 324 and a frequency of capture for primary database logs 326. The primary database logs 326 may be transaction logs, reflecting transactions conducted at the primary database 322. The backup policy 310 may define a first frequency of capture for the primary database snapshots 324 and a second frequency of capture for the primary database logs 326, where the second frequency of capture is higher (more frequent) than the first frequency of capture. In this way, the primary database snapshots 324 provide a first granularity of backup and the primary database logs 326 provide second, higher granularity of backup. In an example, the first frequency of capture for the primary database snapshots 324 is one hour and the second frequency of capture for the primary database logs 326 is fifteen minutes. In an example, the first frequency of capture for the primary database snapshots 324 is fifteen minutes and the second frequency of capture for the primary database logs 326 is five minutes.

The primary database snapshots 324 may be incremental snapshots, such that subsequent snapshots only include data that has changed since a previous snapshot. The primary database logs 326 may be associated with the primary database snapshots 324 such that transaction logs captured after a snapshot can be applied to the snapshot to provide point-in-time recovery (PITR) for the snapshot. In an example, a first snapshot of the primary database snapshots 324 is captured at a first time and a second snapshot of the primary database snapshots 324 is captured at a second time, such that logs of the primary database logs 326 captured between the first time and the second time are associated with the first snapshot in order to provide PITR for the primary database 322 between the first snapshot and the second snapshot.

The primary database snapshots 324 may be created at and stored on the first cluster 320. The primary database logs 326 may be captured and stored on the first cluster 320. The primary database snapshots 324 and/or the primary database logs 326 may be applied to the primary database 322 to recover or restore the primary database 322. In an example, the primary database 322 is reverted to its state at an earlier point in time using the primary database snapshots 324 and the primary database logs 326. The backup policy 310 may cause the primary database snapshots 324 and/or the primary database logs 326 to be created/captured by sending commands to the first cluster 320 and/or the primary database 322. In an example, the backup policy 310 (e.g., a control plane implementing the backup policy 310), transmits a snapshot creation command to the primary database (e.g., to an agent of the control plane executed on the primary database) to cause a snapshot of the primary database 322 to be created.

The system 300 includes a second cluster 330 (also referred to as a computing system) hosting the backup database 332. The second cluster 330 may be a cluster similar to the cluster 100 of FIG. 1. The second cluster 330 may be geographically remote from the first cluster 320. In this way, the second cluster 330 may provide disaster recovery for the primary database 322 such that in the event a disaster occurs causing a rack and/or datacenter where the first cluster 320 is located to go offline, the second cluster 330 will likely not be affected, allowing for the primary database 322 to be recovered at the second cluster 330. In an example, the first cluster 320 and the second cluster 330 are part of a same public cloud, and the first cluster 320 is in a first region of the public cloud and the second cluster 330 is in a second region of the public cloud. In an example, the first cluster 320 is on a public cloud and the second cluster 330 is part of an on-premises system.

The backup database 332 may function as a backup to the primary database 322. Data of the primary database 322 may be replicated to the backup database 332. The data of the primary database 322 may be asynchronously replicated to the backup database 332. Asynchronous replication means that once data is written to the primary database 322, it is replicated to the backup database 332. In this way, the primary database 322 may be backed up to the backup database 332 without affecting a performance of the primary database 322. The asynchronous replication of the data of the primary database 322 to the backup database 332 may cause the backup database 332 to lag behind the primary database 322. An amount of lag between the primary database 322 and the backup database 332 may depend upon various factors including network bandwidth, network latency, disk I/O speed, and/or long-running transactions at the primary database 322.

The primary database snapshots 324 are replicated to the second cluster 330. The primary database logs 326 may be replicated to the second cluster 330. The primary database snapshots 324 and/or the primary database logs 326 may be replicated to the second cluster 330 based one or more commands from the backup policy 310 (e.g., from a control plane implementing the backup policy 310) to the first cluster 320 and/or the primary database 322 (e.g., to an agent of the control plane executed on the primary database 322) to replicate the primary database snapshots 324 and/or the primary database logs 326 to the second cluster 330. In this way, the backup database 332 is an asynchronous backup of the primary database 322 and the second cluster 330 stores the primary database snapshots 324 and/or the primary database logs 326 for a higher-granularity of backup.

Figure 4:
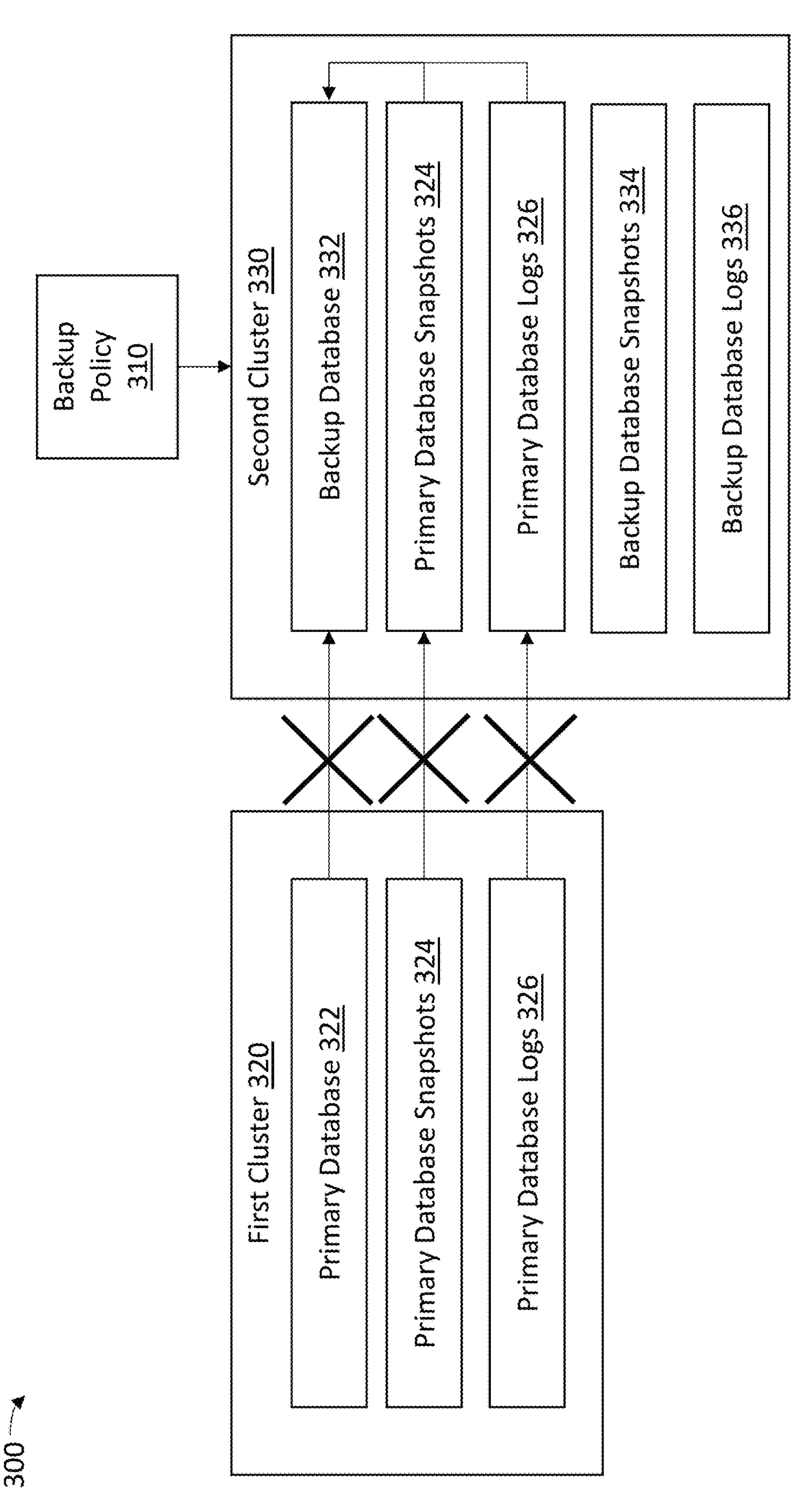
FIG. 4 is a block diagram of the system of FIG. 3 after failover from the primary database to the backup database.

FIG. 4 is a block diagram of the system 300 of FIG. 3 after failover from the primary database 322 to the backup database 332. When the primary database 322 is unavailable, such as when the first cluster 320 goes offline, the primary database 322 fails over to the backup database 332. During the failover, a snapshot of the primary database snapshots 324 and/or corresponding logs of the primary database logs 326 are applied to the backup database 332. In this way, data of the primary database 322 is not lost due to latency of the asynchronous replication of data of the primary database 322 to the backup database 332. In an example, a lag of one hour between the primary database 322 and the backup database 332 would cause up to one hour's worth of updates to the primary database 322 to be lost upon failover, but the primary database snapshots 324 are captured in thirty minute increments, reducing the potential data loss to thirty minutes or less, and the primary database logs 326 are captured in ten minute increments, further reducing the potential data loss to ten minutes or less. In this example, a most recent snapshot of the primary database snapshots 324 stored on the second cluster 330 is applied to the backup database 332 and transaction logs of the primary database logs 326 stored on the second cluster 330 which were captured after the most recent snapshot are applied to the backup database 332 to advance the backup database 332 forward in time to the moment of a most recent log. In this way, a recovery point objective of the recovery at the backup database 332 is reduced and is not variable based on the lag between the primary database 322 and the second cluster 330.

The backup database 332 may function as an active database. An application using the primary database 322 before the failover may use the backup database 332 after the failover. In this way, the backup database 332 allows for the application to continue functioning with minimal data loss.

During the failover, the backup policy 310 switches (e.g., is switched by the control plane) to the backup database 332. The backup policy 310 may perform the same functions on the backup database 332 after the failover that the backup policy 310 performed on the primary database 322 before the failover. The backup policy 310 may create backup database snapshots 334 at the first frequency of capture for the primary database snapshots 324. The backup policy 310 may capture backup database logs 336 at the second frequency of capture for the primary database logs 326. In an example, the backup policy 310 redirects commands to the primary database 322 (e.g., the agent of the control plane executing on the primary database 322) to the backup database 332 (e.g., an agent of the control plane executing on the backup database 332). In this way, snapshots and/or logs continue to be captured at a same predefined interval before and after the failover, with the backup policy 310 capturing the primary database snapshots 324 and/or the primary database logs 326 at the predefined interval before the failover and the backup policy 310 capturing the backup database snapshots 334 and/or the backup database logs 336 at the predefined interval after the failover. The backup database snapshots 334 and/or the backup database logs 336 are stored at the second cluster 330.

Figure 5:
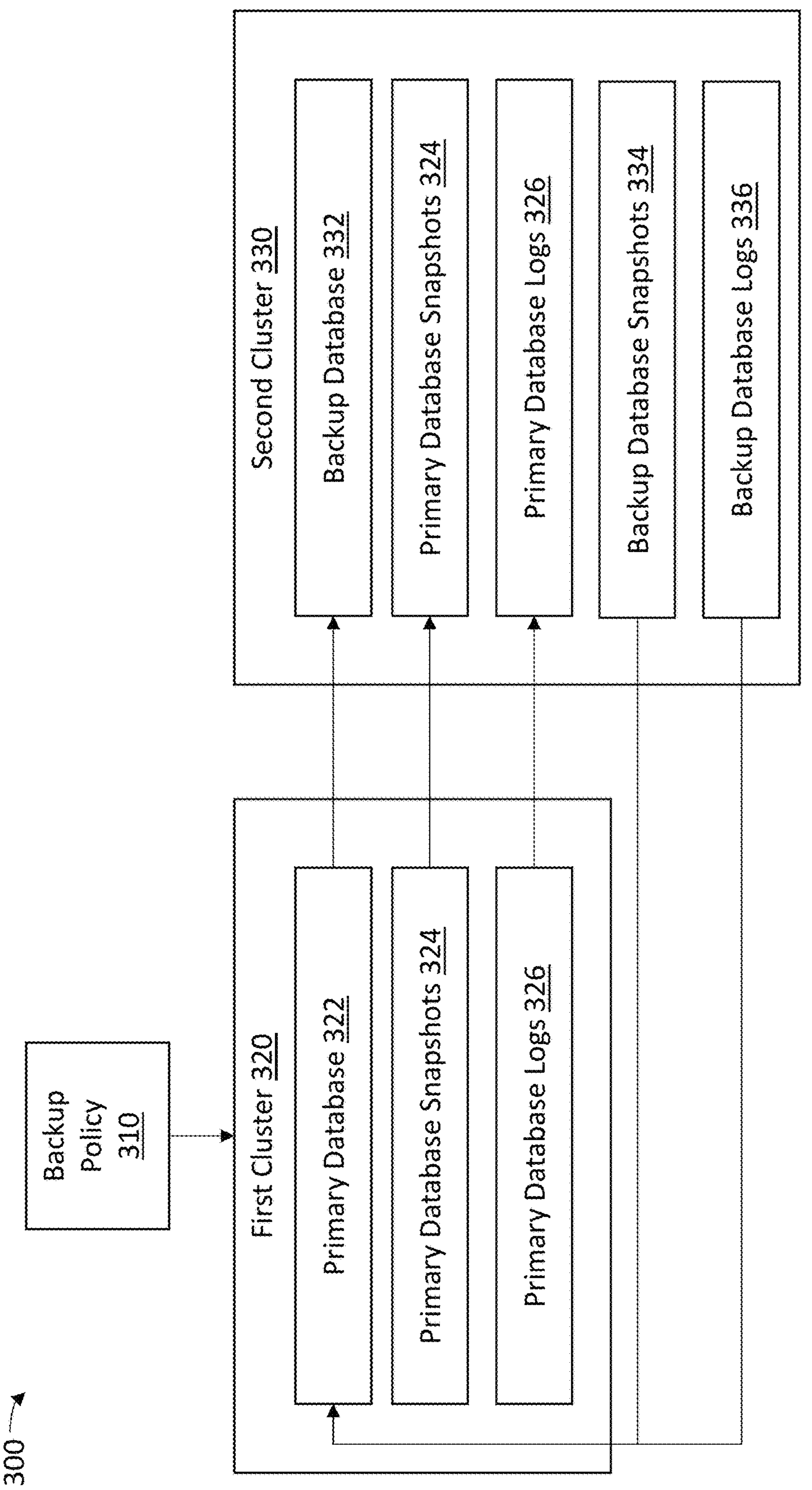
FIG. 5 is a block diagram of the system of FIG. 3 when the primary database is once again available.

FIG. 5 is a block diagram of the system 300 of FIG. 3 when the primary database 322 is once again available. When the primary database 322 is once again available, the backup database 332 fails back to the primary database 322 to render the primary database 322 operational once again. The failback includes applying a snapshot of the backup database snapshots 334 and/or logs of the backup database logs 336 to the primary database 322. In an example, a most recent snapshot of the backup database snapshots 334 and corresponding logs (i.e., logs captured after the most recent snapshot) of the backup database logs 336 are applied to the primary database 322. In this way, the primary database 322 is recovered with updates to the backup database 332 that occurred while the primary database 322 was unavailable. A moment of the failback may be selected to minimize data loss in recovering the primary database 322. The primary database 322 may once again function as an active database such that an application using the primary database 322 before the failover uses the backup database 332 after the failover, and then uses the primary database 322 again after the failback. In this way, the application is able to operate continuously despite the failover with minimal data loss.

The backup policy 310, after the failback, or in response to the primary database 322 having restored availability, switches (e.g., is switched by the control plane) back to the primary database 322. The backup policy 310 continues to create the primary database snapshots 324 and/or to capture the primary database logs 326. The primary database snapshots 324 are replicated to the second cluster 330 and/or the primary database logs 326 are replicated to the second cluster 330. The data of the primary database 322 is asynchronously replicated to the backup database 332. In this way, the system 300, after the failback, similar to the state of the system 300 in FIG. 4, with the backup database 332 functioning as a backup to the primary database 322 and with the primary database snapshots 324 and/or the primary database logs 326 being replicated to the second cluster 330 for disaster recovery purposes.

Figure 6:
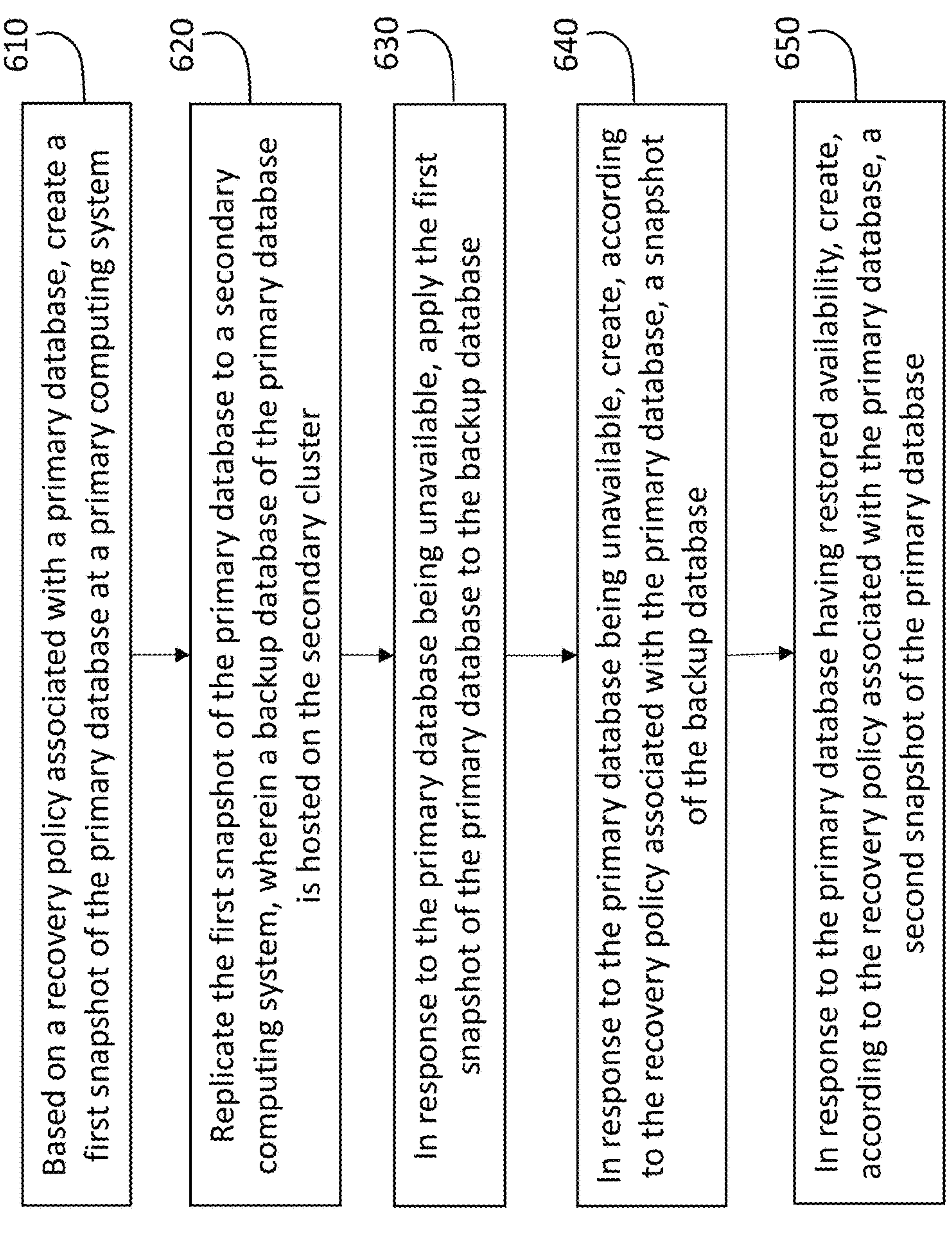
FIG. 6 is a flow diagram illustrating operations of a method for recovering data of a primary database at a backup database.

FIG. 6 is a flow diagram illustrating operations of a method 600 for recovering data of a primary database at a backup database. The method 600 may be performed by the control plane 210 of FIG. 2. In some implementations, the method 600 may be performed by the backup service 212 of FIG. 2.

At operation 610, based on a recovery policy associated with a primary database, a first snapshot of the primary database is created at a primary computing system. The primary database is hosted on the primary computing system. The primary computing system may be a cluster of nodes similar to the cluster 100 of FIG. 1. The first snapshot of the primary database may be stored on the primary computing system. In some implementations, creating the first snapshot of the primary database includes transmitting a snapshot creation command to the primary database, or to an agent of a control plane, the agent executed on the primary database. In some implementations, the method 600 includes, based on the recovery policy, creating snapshots of the primary database at a predefined interval. The predefined interval may be an hour, thirty minutes, twenty minutes, fifteen minutes, or any interval.

In some implementations, the method 600 includes, based on the recovery policy, capturing logs of the primary database. The logs may be transaction logs representing transactions performed at the primary database.

At operation 620, the first snapshot of the primary database is replicated to a secondary computing system. A backup database of the primary database may be hosted on the secondary computing system. The secondary computing system may be geographically remote from the primary computing system. The secondary computing system may be a cluster of nodes similar to the cluster 100 of FIG. 1. In some implementations, the primary database is asynchronously replicated to the backup database.

At operation 630, in response to the primary database being unavailable, the first snapshot of the primary database is applied to the backup database. The primary database may be unavailable due to a loss of power at the primary computing system, or at a datacenter including the primary computing system. In some implementations, the method 600 includes monitoring a status of the primary database to determine when the primary database is unavailable. In some implementations, a subset of the logs of the primary database are applied to the backup database upon applying the first snapshot of the primary database to the backup database. The subset of the captured logs may be captured after the first snapshot was created to provide PITR at the backup database based on the first snapshot and the subset of the captured logs.

At operation 640, in response to the primary database being unavailable, create, according to the recovery policy associated with the primary database, a snapshot of the backup database. In some implementations, the method 600 includes, in response to the primary database being unavailable, switching the recovery policy from the primary database to the backup database to take the snapshot of the backup database. In some implementations, the method 600 includes, in response to the primary database being unavailable, creating snapshots of the backup database at the predefined interval at which snapshots of the primary database were created.

At operation 650, in response to the primary database having restored availability, create, according to the recovery policy associated with the primary database a second snapshot of the primary database. In some implementations, the method 600 includes, in response to the primary database having restored availability, switching the recovery policy from the backup database to the primary database to take the second snapshot of the primary database.

In some implementations, the recovery policy is implemented by a service running or executed on a control plane. The control plane may perform the method 600 by sending commands to the primary database and the backup database. The control plane may send commands to a plurality of databases hosted on one or more public clouds and/or on one or more on-premises systems. The primary database and the backup database may be hosted in different locations and in different systems. In an example, the primary database is in a first region of a public cloud and the backup database is in a second region of the public cloud. In an example, the primary database is in an on-premises system and the backup database is in a public cloud. In an example, the primary database is in a private cloud and the backup database is in an on-premises system.

The foregoing detailed description includes illustrative examples of various aspects and implementations and provides an overview or framework for understanding the nature and character of the claimed aspects and implementations. The drawings provide illustration and a further understanding of the various aspects and implementations and are incorporated in and constitute a part of this specification.

The subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatuses. A computer storage medium can be, or be included in, a computer-readable storage device, a computer-readable storage substrate, a random or serial access memory array or device, or a combination of one or more of them. While a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices). The operations described in this specification can be implemented as operations performed by a data processing apparatus on data stored on one or more computer-readable storage devices or received from other sources.

The terms "computing device" or "component" encompass various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a model stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, app, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program can correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs (e.g., components of the monitoring device 102) to perform actions by operating on input data and generating an output. The processes and logic flows can also be performed by, and apparatuses can also be implemented as, special purpose logic circuitry, e.g., an FPGA (field programmable gate array) or an ASIC (application specific integrated circuit). Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks. The processor and the memory can be supplemented by, or incorporated in, special purpose logic circuitry.

While operations are depicted in the drawings in a particular order, such operations are not required to be performed in the particular order shown or in sequential order, and all illustrated operations are not required to be performed. Actions described herein can be performed in a different order. The separation of various system components does not require separation in all implementations, and the described program components can be included in a single hardware or software product.

The phraseology and terminology used herein is for the purpose of description and should not be regarded as limiting. Any references to implementations or elements or acts of the systems and methods herein referred to in the singular may also embrace implementations including a plurality of these elements, and any references in plural to any implementation or element or act herein may also embrace implementations including only a single element. Any implementation disclosed herein may be combined with any other implementation or embodiment.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

The foregoing implementations are illustrative rather than limiting of the described systems and methods. Scope of the systems and methods described herein is thus indicated by the appended claims, rather than the foregoing description, and changes that come within the meaning and range of equivalency of the claims are embraced therein.

What is claimed is:

1. A method for failover and failback of a database system, the method comprising:

capturing snapshots and logs of a primary database at predefined intervals according to a backup policy, applying a most recent snapshot of the primary database and corresponding logs to a backup database during a failover from the primary database to maintain data synchronization, capturing snapshots and logs of the backup database at the predefined intervals during a failover period according to the backup policy, and applying a most recent snapshot of the backup database and corresponding logs to the primary database upon restoring availability of the primary database.

2. The method of claim 1, wherein the predefined intervals comprise a first frequency for capturing snapshots and a second frequency for capturing logs, wherein the second frequency is higher than the first frequency.

3. The method of claim 1, wherein capturing the snapshots and logs of the primary database includes transmitting snapshot creation commands and log capture commands to the primary database according to the backup policy.

4. The method of claim 1, wherein the snapshots are incremental snapshots that include only data that has changed since a previous snapshot.

5. The method of claim 1, wherein the logs of the primary database are transaction logs reflecting transactions conducted at the primary database, and wherein the logs of the backup database are transaction logs reflecting transactions conducted at the backup database.

6. The method of claim 1, further comprising replicating the snapshots and logs of the primary database to a secondary computing system hosting the backup database.

7. The method of claim 6, wherein the secondary computing system is geographically remote from a primary computing system hosting the primary database.

8. The method of claim 1, further comprising monitoring a status of the primary database to determine when the primary database is unavailable.

9. The method of claim 1, further comprising switching the backup policy from the primary database to the backup database during the failover and switching the backup policy from the backup database back to the primary database upon restoring availability of the primary database.

10. The method of claim 1, wherein data of the primary database is asynchronously replicated to the backup database, and wherein applying the most recent snapshot of the primary database and corresponding logs reduces data loss caused by synchronization lag between the primary database and the backup database.

11. A non-transitory, computer-readable medium storing instructions that, when executed by one or more processors, cause the one or more processors to:

capture snapshots and logs of a primary database at predefined intervals according to a backup policy;

apply a most recent snapshot of the primary database and corresponding logs to a backup database during a failover from the primary database to maintain data synchronization;

capture snapshots and logs of the backup database at the predefined intervals during a failover period according to the backup policy, and apply a most recent snapshot of the backup database and corresponding logs to the primary database upon restoring availability of the primary database.

12. The non-transitory, computer-readable medium of claim 11, wherein the predefined intervals comprise a first frequency for capturing snapshots and a second frequency for capturing logs, wherein the second frequency is higher than the first frequency.

13. The non-transitory, computer-readable medium of claim 11, wherein the instructions cause the one or more processors to capture the snapshots and logs of the primary database by transmitting snapshot creation commands and log capture commands to the primary database according to the backup policy.

14. The non-transitory, computer-readable medium of claim 11, wherein the snapshots are incremental snapshots that include only data that has changed since a previous snapshot.

15. The non-transitory, computer-readable medium of claim 11, wherein the logs of the primary database are transaction logs reflecting transactions conducted at the primary database, and wherein the logs of the backup database are transaction logs reflecting transactions conducted at the backup database.

16. The non-transitory, computer-readable medium of claim 11, wherein the instructions cause the one or more processors to replicate the snapshots and logs of the primary database to a secondary computing system hosting the backup database.

17. The non-transitory, computer-readable medium of claim 16, wherein the secondary computing system is geographically remote from a primary computing system hosting the primary database.

18. The non-transitory, computer-readable medium of claim 11, wherein the instructions cause the one or more processors to monitor a status of the primary database to determine when the primary database is unavailable.

19. The non-transitory, computer-readable medium of claim 11, wherein the instructions cause the one or more processors to switch the backup policy from the primary database to the backup database during the failover and switch the backup policy from the backup database back to the primary database upon restoring availability of the primary database.

20. The non-transitory, computer-readable medium of claim 11, wherein data of the primary database is asynchronously replicated to the backup database, and wherein the instructions cause the one or more processors to apply the most recent snapshot of the primary database and corresponding logs to reduce data loss caused by synchronization lag between the primary database and the backup database.

* * * * *